Oct. 22, 1935.   O. A. McNAMEE   2,018,217
MEASURING DEVICE
Filed June 25, 1932   3 Sheets-Sheet 2

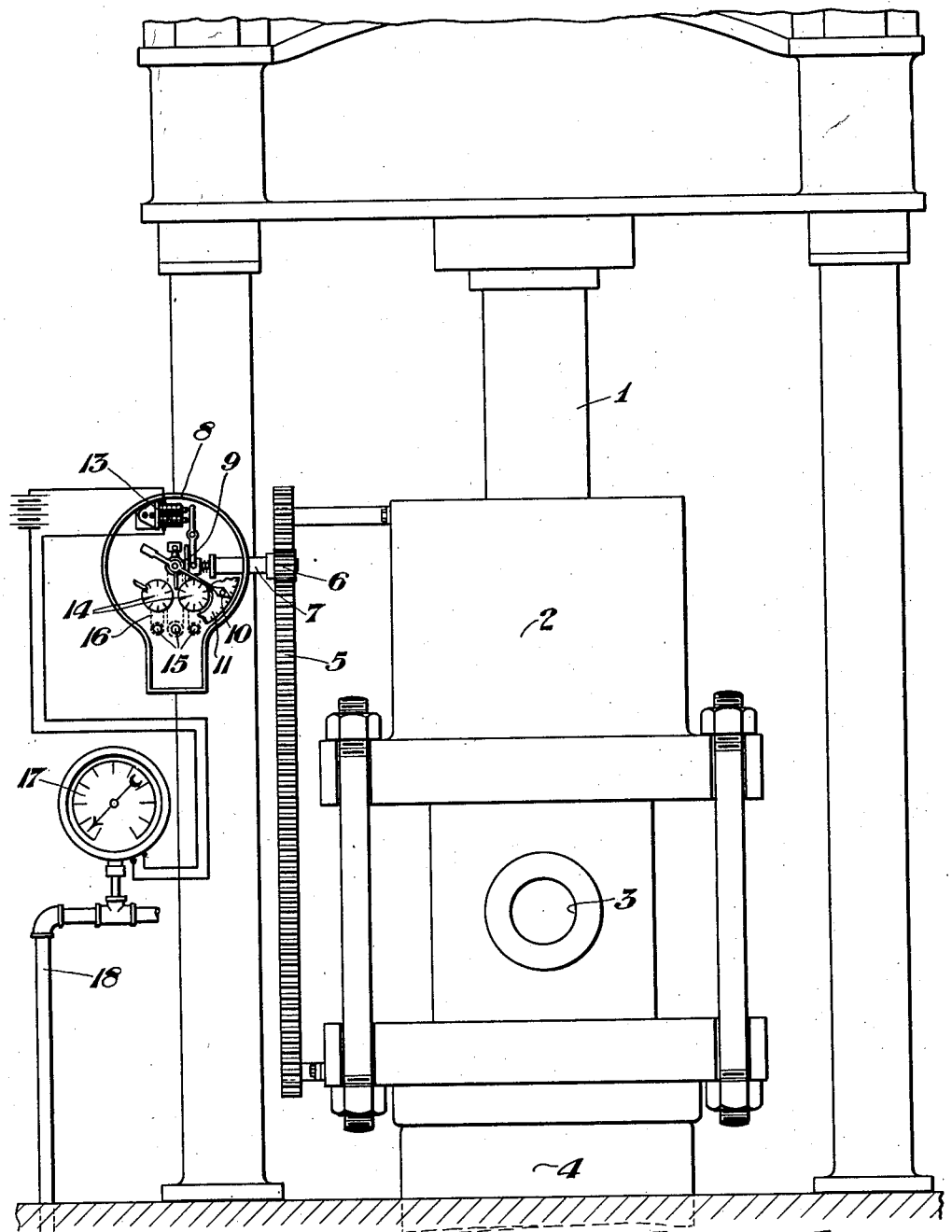

Inventor:
OWEN A. McNAMEE,
by Usina & Rauber
his Attorneys.

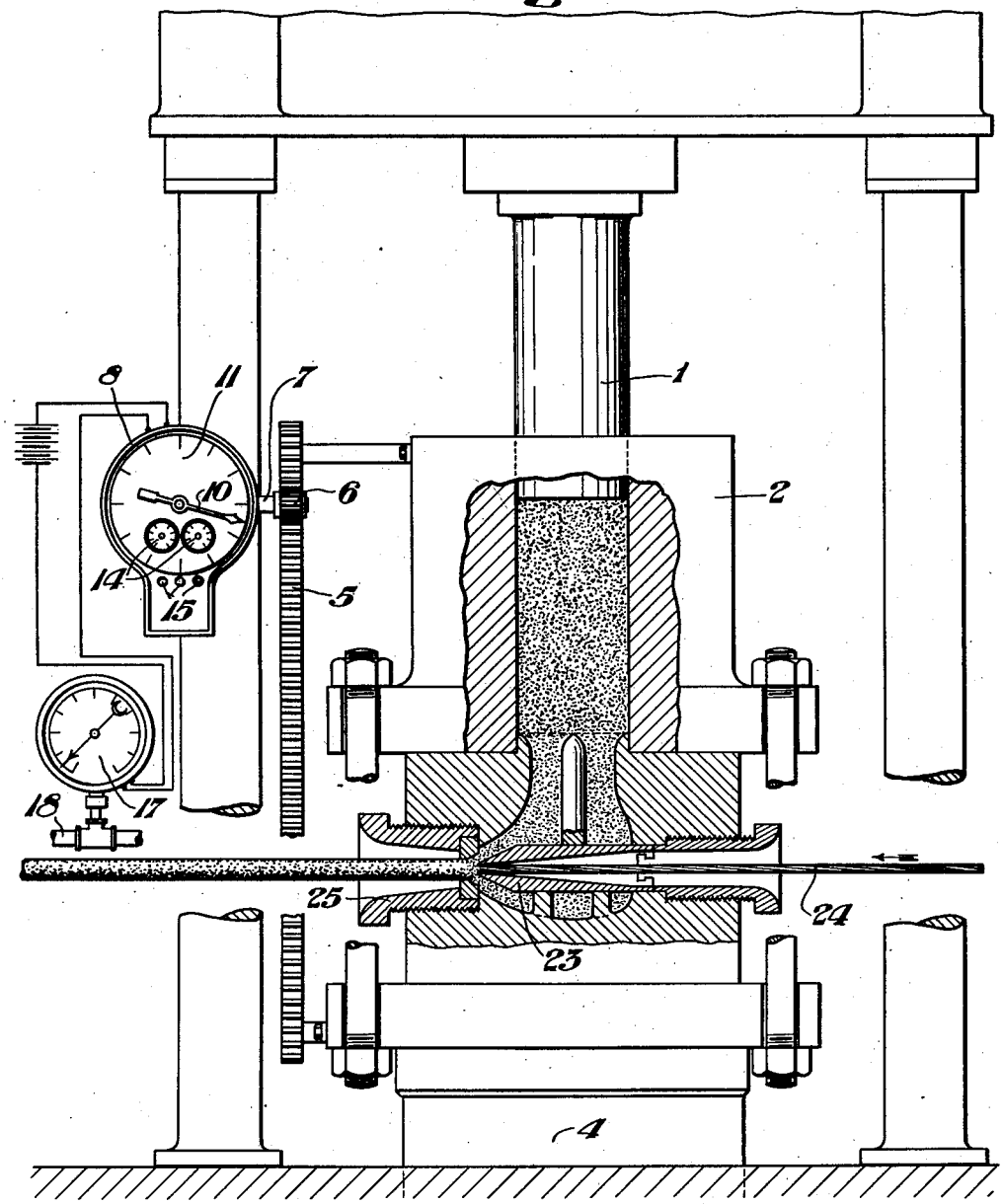

Patented Oct. 22, 1935

2,018,217

UNITED STATES PATENT OFFICE 2,018,217

MEASURING DEVICE

Owen A. McNamee, Worcester, Mass.

Application June 25, 1932, Serial No. 619,317

6 Claims. (Cl. 33—125)

This invention is an apparatus for measuring material extruded from a press and, specifically, from a press operated by a hydraulic ram. It is particularly intended for use with a press constructed to extrude solid lead in the form of a cable covering. Such a press does not function properly until the application of full working pressure, and one of the objects of the present invention is to provide a measuring device which does not begin to function until working conditions are established. Other objects will be understood from the following disclosure.

Having reference to the accompanying drawings, which illustrate a specific form of this invention:

Figure 1 is a front elevation of a press incorporating this invention.

Figure 5 illustrates the invention as applied to a press extruding a lead covering directly on a cable.

Figure 3:
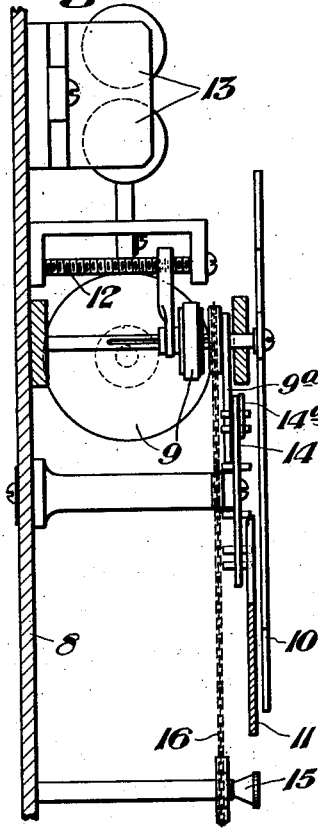
Figure 3 is a side elevation of Figure 2.
Figure 2:
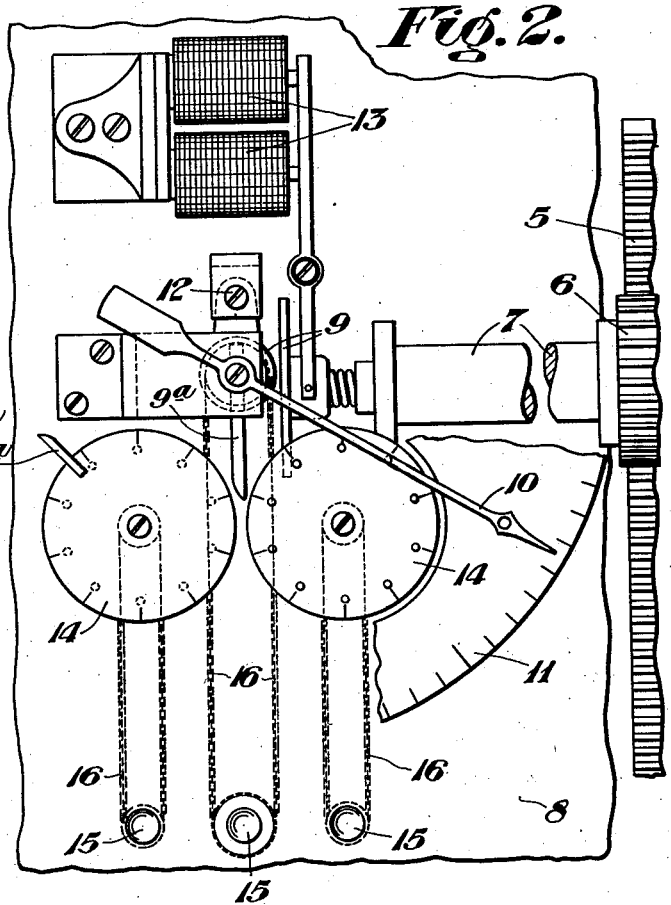
Figure 2 is an enlarged detail of the invention as shown in Figure 1.
Figure 4:
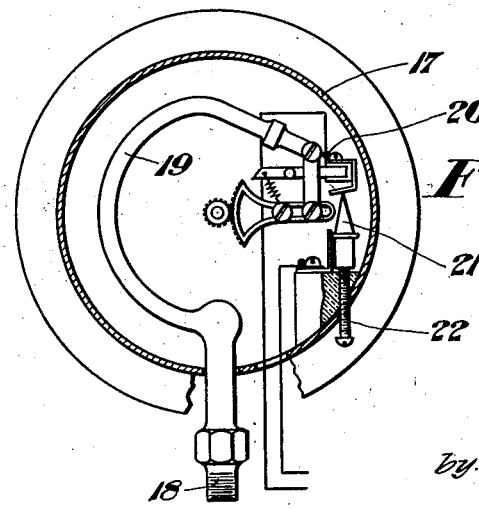
Figure 4 is an enlarged cross-sectional elevation of a detail from Figure 1.

In detail, the press to which this invention is applied consists of a stationarily mounted plunger 1 fitting in a heavy cylinder 2 which is filled with lead for extrusion through an orifice 3 in the form of a cable covering, these latter parts being moved upwardly against the fixed plunger by a hydraulic ram 4.

The movable parts of this press carry a rack 5 which is engaged by a pinion 6 fixed to a shaft 7 projecting from the casing of an indicator 8.

Inside of the casing of the indicator 8 is a spring engaged friction gearing 9 which connects the inner end of the shaft 7 to a pointer 10. This pointer is arranged so as to be visible and converts the travelling distance of the ram 4 into extruded material poundage measure, this pointer operating on a scale 11 graduated into tenths of a pound. The ratio of the friction gearing 9 may be varied by means of a screw 12 so that varyingly sized presses may be accommodated. The gearing may be disengaged against its spring pressure by means of an electromagnet 13 whose pivoted armature is in connection therewith.

This indicator may be made to measure any poundage of extruded material by the inclusion of one or more subsidiary dials 14 which progressively sum up the number of rotations of the pointer 10 and which may be constructed in any one of a number of well known ways. These dials are shown calibrated in powers of ten. Each of these indicating elements may be manually reset by means of knobs 15 which project through the exterior of the casing and are connected through small belts or chains 16. The dials 14 are progressively operated by a finger 9a moved by the pointer 10 and engaging pins on left-hand dial, this dial in turn carrying a finger 14a engaging pins on the other dial.

When the press is first started the ram 4 will move upwardly a considerable distance, in compressing the lead in the cylinder 2 to a more compact structure, before working conditions are properly established. It is, of course, not desirable to have the indicator operate during this period and means are therefore supplied for energizing the electromagnet 13 which will declutch the indicator from operative engagement with the press.

This means may consist of a Bourdon gage 17 which is arranged in fluid connection, through piping 18, with the ram 4. The dial operating hydrostatic tube 19 in this gage also operates a pair of contacts 20 and 21 which are arranged in electrical circuit with the electromagnet. This connection and the operating mechanism of the ram 4 are not shown because their structure and general details are so well known that their inclusion would needlessly complicate the issue.

The contact 21 is made so that it can be adjusted by a screw 22 and is set so that contact between these points is maintained until the hydrostatic pressure in the pipe 18, and of course in the ram 4, has attained a pressure which insures proper extrusion of lead from the press. Normally, in a press of the character illustrated this pressure will be approximately 400 tons. When these contacts break the circuit to the electromagnet 13 the spring-operated clutch 9 will automatically place the indicator 8 in operative engagement with the ram 4, through gearing already described, so that the indicator at once begins to function.

Another type with which the invention may be used is shown by Figure 5. In this form the lead is extruded directly onto a cable. It is generally similar to the press already described except that the male die 23 is bored to receive the cable 24 so that the female die 25 can mold the lead directly thereon. This type of press is familiar to all and need not be further described. It might be pointed out that in this instance it is extremely important that the lead be uniformly extruded because otherwise the product will not be commercially marketable.

Although a specific form of this measuring device has been shown and described in accordance with the patent statutes, it is not intended to limit the scope of the invention exactly thereto, except as defined by the following claims.

I claim:

1. An apparatus for measuring material extruded from a press operated by a ram, including means for measuring the travelling distance of said ram, means including a clutch for gearing said measuring means to said ram and means operable when said ram applies a predetermined force to said press for operating said clutch.

2. An apparatus for measuring material extruded from a press operated by a hydraulic ram, including means for measuring the travelling distance of said ram, means including a clutch for gearing said measuring means to said ram and means operable by the fluid pressure of said hydraulic ram for operating said clutch.

3. An apparatus for measuring material extruded from a press operated by a hydraulic ram, comprising means for measuring the travelling distance of said ram, means including an electromagnetically operated clutch for gearing said measuring means to said ram, current conducting means for energizing the electromagnet operating said clutch, a switch interposed in said last named means and hydrostatically operated means arranged in fluid connection with said hydraulic ram for operating said switch when a predetermined pressure is attained.

4. An apparatus for measuring material extruded from a press operated by a hydraulic ram, comprising an indicator constructed and arranged to read in extruded material poundage measure as estimated from the measure of said ram's travelling distance, means including an electromagnetically operated clutch for gearing said indicator to said ram, means for varying the said means gear ratio to compensate for varyingly sized presses, current conducting means for energizing the electromagnet operating said clutch, a Bourdon gage in connection with said hydraulic ram's working fluid, and a switch operated by the tube movement of said gage and interposed in said current conducting means.

5. An apparatus for measuring material extruded from a press operated by a ram, including indicating means operable by movement of said ram when associated with the latter and means responsive to the application of extrusion force to said material for associating said indicating means with said ram.

6. The combination of a chamber having an outlet, a displacement member for extruding material in said chamber through said outlet upon relative movement of said chamber and said member, means for applying force to cause said relative movement, means for measuring said relative movement and means responsive to the degree of force applied by the first named means for controlling operation of the second named means.

OWEN A. McNAMEE.